United States Patent
Nair

(10) Patent No.: US 9,100,344 B2
(45) Date of Patent: Aug. 4, 2015

(54) LABEL-BASED PARTITIONING FOR NETWORK SUBSCRIBERS

(75) Inventor: Narendranath Nair, Bangalore (IN)

(73) Assignee: Wipro Limited, Bangalore (IN)

( * ) Notice: Subject to any disclaimer, the term of this patent is extended or adjusted under 35 U.S.C. 154(b) by 1420 days.

(21) Appl. No.: 11/616,032

(22) Filed: Dec. 26, 2006

(65) Prior Publication Data

US 2008/0155081 A1    Jun. 26, 2008

(51) Int. Cl.
*H04L 12/24* (2006.01)
*H04L 29/08* (2006.01)
*G06F 15/173* (2006.01)

(52) U.S. Cl.
CPC .......... *H04L 41/5067* (2013.01); *H04L 67/306* (2013.01)

(58) Field of Classification Search
CPC ........................... H04L 41/5067; H04L 67/306
USPC ......................................................... 709/223
See application file for complete search history.

(56) References Cited

U.S. PATENT DOCUMENTS

| | | |
|---|---|---|
| 7,027,574 B2 | 4/2006 | Nolting |
| 7,032,016 B2 | 4/2006 | Cerami et al. |
| 7,035,211 B1 | 4/2006 | Smith et al. |
| 7,035,259 B2 | 4/2006 | Nomura et al. |
| 7,043,659 B1 | 5/2006 | Klein et al. |
| 2005/0080886 A1* | 4/2005 | Croy et al. ..................... 709/223 |
| 2005/0132016 A1* | 6/2005 | Boone ............................ 709/207 |
| 2005/0169179 A1 | 8/2005 | Antal et al. |
| 2005/0182852 A1 | 8/2005 | Tinsley et al. |
| 2005/0187905 A1 | 8/2005 | Dixon et al. |
| 2005/0188364 A1 | 8/2005 | Cockx et al. |
| 2005/0192884 A1 | 9/2005 | Raines |
| 2005/0193269 A1 | 9/2005 | Haswell et al. |
| 2005/0195221 A1 | 9/2005 | Berger et al. |
| 2005/0195741 A1 | 9/2005 | Doshi et al. |
| 2005/0195808 A1 | 9/2005 | Chen et al. |
| 2005/0197875 A1 | 9/2005 | Kauffman |
| 2005/0197993 A1 | 9/2005 | Korotky |
| 2005/0198228 A1 | 9/2005 | Bajwa et al. |
| 2005/0198247 A1* | 9/2005 | Perry et al. ..................... 709/223 |
| 2005/0207367 A1 | 9/2005 | Onggosanusi et al. |
| 2005/0210027 A1 | 9/2005 | Aggarwal et al. |
| 2005/0210178 A1 | 9/2005 | Klingman |
| 2005/0234910 A1* | 10/2005 | Buchheit et al. .................. 707/9 |
| 2006/0173813 A1* | 8/2006 | Zorola .............................. 707/2 |
| 2006/0173873 A1* | 8/2006 | Prompt et al. ................. 707/100 |

* cited by examiner

*Primary Examiner* — Suraj Joshi
(74) *Attorney, Agent, or Firm* — LeClairRyan, a Professional Corporation

(57) ABSTRACT

A method of providing a new network service to selected subscribers, who are already receiving known network services, uses labels. A distinct label is assigned to each network service and is also attached to subscribers already receiving that service. To access newly selected subscribers for providing a further service or a notification, the method uses predetermined subscriber-access-labels which lead to a class of intended subscribers. The intended subscribers are listed by using the subscriber-access-labels and a label-matching-algorithm in a flat hierarchy to generate a list of the newly selected subscribers. The list assists to dispense either a new network service or otherwise to reach them. Label matching also enables producing a desired list of specified network services. A computer readable medium for the method is included. The present method enables faster service by avoiding a largely hierarchical approach to retrieving customer listings, and is well suited for applications like AJAX®.

15 Claims, 3 Drawing Sheets

| Object | Type | Description |
|---|---|---|
| ResourceLabelTable | | Table |
| ResourceLabelEntry | | Entry |
| ResourceLabelIndex | Object Identifier | Points to the MIB object being labeled (if this points to a table or a group, the entire MIB subtree is labeled) |
| ResourceLabel | String | Value of the Label |

FIG 1

LABEL-BASED PARTITIONING FOR NETWORK SUBSCRIBERS

FIELD OF THE INVENTION

This invention generally relates to methods of accessing subscribers and network resources in telecommunication networks, and more particularly to a method of identifying subscribers for rendering a new network service based on certain known criteria.

BACKGROUND OF THE INVENTION

Different aspects of managing a communication network have been addressed in prior art with varying results. U.S. Pat. No. 7,043,659 to Klein et al, for example, teaches a system and method which enable flexibility in configuring management behavior of a network management system. A user in said Klein et al patent may specify the management actions to be performed by a management policy and the process to be utilized by the management policy in performing such management actions.

Published U.S. patent application 2005018790 teaches a database wherein data is represented in a manner that expresses the structure inherent in the data as one or more "augmented clauses", where each clause has a pair (c,G) including a database element c and a group G of group elements g acting on it. A query is encoded in a group theory representation and is executed on the group theory representation of the data to identify database elements and associated group elements satisfying the query.

Management of telecommunication networks involves complexity and has evolved to be sophisticated, assisting in catering several subscribers and network resources for rendering a variety of network services. Generally, in Telecom Management Networks (TMN), subscriber and network resource information is represented in a predominantly hierarchical manner, and, management applications are developed and implemented using the hierarchical information model. There exist known standards that govern the design and use of such models. For example, ITU-T recommendation M.300 and related series of technical recommendations relate to the representation of network resources and information in a hierarchical way. In network management, several different kinds of network service are offered to different subsets of customers. It is known that subscriber provisioning and management, and network inventory uploading are complex and time consuming tasks in telecom networks. In known methods of network management for accessing required subscribers based on predetermined criteria, uploading of network inventory is performed. However, uploading network inventory ends up to be a time consuming process, and results in high operating costs owing to the hierarchical information model. It is also known that it is a time consuming process to access the listings of network resources and services which are being offered to specific subscribers and customers.

A network operator would sometimes need to access a listing of the types of service being offered to subscribers. If the network management intends to offer a promotional service to selected subscribers, the network operator would need to run multiple commands to get information pertaining to the required subset of such subscribers. The operator would then need to run scripts to provision the promotional service. Alternatively, the operator could do computations manually from the graphical user interface. Both approaches are labor intensive, inefficient and uneconomical. The hierarchical representation, also known as containment hierarchy of network resources (e.g., a network port is uniquely represented as Equipment-ID: shelf ID: Subrack-ID:SlotID:PortID) is the primary cause for the inefficiency. It is also noted that day-to-day monitoring and uploading of network inventory is involved with the use of known methods.

SUMMARY OF THE INVENTION

The present invention addresses the issue of how to simplify providing a promotional network service to selected subscribers by obviating the disadvantages of prior art approaches. The invention also provides a method of accessing the listing of services provided by the network in a simple manner without the disadvantages of prior art approaches. Thus, the present approach simplifies operations including monitoring of network (by partitioning by creating subscriber subsets), and simplifies the operation of uploading of the network inventory. The present invention uses a label based partitioning approach and does away with the predominantly hierarchical information model and saves on time and expense in identifying a subset of subscribers who might receive a new or promotional network service. The invention applies the label based approach also to identifying the types of network service available to subscribers. To this end, the present approach uses labels which represent each network service. Appropriate labels are also attached to subscribers who have elected to receive corresponding network services. Thus, each subscriber might have several attached labels based on the different network services the subscriber has chosen to receive. Also, a specific network service label might be seen attached to many subscribers all of whom have elected to receive the corresponding network service. For instance, a board/card on the shelf of telecommunication equipment can be labeled. Such resource labeling would help in partitioning the network. It is also noted that inventory information can be uploaded faster from a network which is thus partitioned. Also, there might be some cards/boards on the equipment that have been observed to be faulty (say, the card resets periodically). If the operator wishes to monitor such cards using previously known methods, the operator would typically (a) write a script for monitoring, and (b) put a filter from an alarm panel for monitoring faults on the card in question. The operator might attach labels to such cards perceived as faulty, and, from a graphic user interface itself do a monitoring of the labeled cards. The advantage is that the operator has a view-console from where it is possible to not only monitor the faulty component equipment, but also related equipment such as a subscriber port that is contained in a card/board.

To obtain a subset of selected subscribers who meet certain criteria decided by labels, in one approach, the present invention expediently uses the technique of modern indexing algorithms for fast label-searching and matching of labels. An example of the technique is by using a search engine such as used by Google®. Other label searching and matching techniques are equally applicable in the implementation of the present invention. Advantageously, a SNMP (Simple Network Management Protocol) label MIB (Management Information Base) is maintained with stored information pertaining to different network service labels and subscribers.

The present invention in one form resides in a method in a telecommunication management network serving a plurality of subscribers, the method being directed to managing a specific management application service for selected subscribers without uploading network inventory, comprising the steps of: assigning a unique label for each service resource in the network, and attaching said unique label also to a subscriber who has elected to receive said each service; identifying one or more predetermined subscriber-access labels associated with a new management application service which the network wishes to provide to selected subscribers who can be identified through at least said one unique label; generating an operator-view of a listing of those subscribers who have said predetermined subscriber-access labels; and, initiating completion of said new management application service based on said listing.

In a second form, the invention resides in a method of performing a network management function in a telecommunication network which serves a plurality of subscribers, said management function being intended to provide a specific desired new service to selected subscribers, each of said subscribers being characterized by a type of network service that a subscriber has elected to receive, the method comprising the steps of: assigning a unique label to each type of network service in the telecommunication network and attaching said unique label also to each subscriber who has elected to receive a corresponding service; identifying subscribers with predetermined labels to whom the network management wishes to provide a new service, said step of identifying being performed by using a label-searching approach to match said predetermined labels, and; initiating completion of said management function to said identified subscribers.

In another form the invention resides in a method in telecommunication network catering to several subscribers among whom certain subscribers have elected to receive certain specific network services from the network, the method being directed to accessing required categories of subscribers without uploading network inventory and comprising: assigning a specific network service label to each type of network service; attaching each said specific service label to a subscriber who has chosen to receive said each type of network service, whereby a given subscriber may have one or more attached network service labels, and a given specific service label may be seen attached to more than one subscriber, and; subsequently accessing a required category of subscribers who have a combination of predetermined attached network service labels by using a label matching algorithm in a flat hierarchy to generate a listing of said required category of subscribers. A modification comprises a method in a telecommunication network catering to several subscribers among whom certain subscribers have elected to receive certain specific network services from the network, the method being directed to accessing required categories of network services without uploading network inventory and comprising: assigning a specific network service label to each type of network service; attaching each said specific service label to a subscriber who has chosen to receive said each type of network service, whereby a given subscriber may have one or more attached network service labels, and a given specific service label may be seen attached to more than one subscriber, and; subsequently accessing a required category of network services by using a label matching algorithm in a flat hierarchy to generate a listing of said required category of network services.

In yet another form, the invention resides in a method in a network management system which caters to several subscribers among whom certain subscribers have elected to receive certain specific network services from the network, the method being directed to providing a specific network service to a selected category of subscribers without uploading network inventory, and comprising: assigning a specific network service label to each type of network service; attaching each said specific service label to a subscriber who has chosen to receive said each type of network service, whereby a given subscriber may have one or more attached network service labels, and a given specific service label may be seen attached to more than one subscriber; subsequently accessing a required category of subscribers who have a combination of predetermined attached network service labels by using a label matching algorithm in a flat hierarchy to generate a listing of said selected category of subscribers, and; initiating the specific network service to subscribers contained in said listing of said selected category of subscribers.

Also included in the scope of the invention are computer readable medium encoded with data/instruction which when executed by a computing platform would result in execution of a method recited in any of the paragraphs supra.

BRIEF DESCRIPTION OF THE DRAWING

A more detailed understanding of the invention may be had from the following description of certain embodiments, to be understood in conjunction with the accompanying drawings that form a part hereof, and in which are shown by way of illustration specific embodiments in which the invention may be practiced. It is understood that other embodiments may be utilized and structural changes may be made without departing from the scope of the present invention. In the accompanying drawings:

FIG. 1 illustrates the basic idea of an SNMP label MIB;

DETAILED DESCRIPTION

Figure 2:
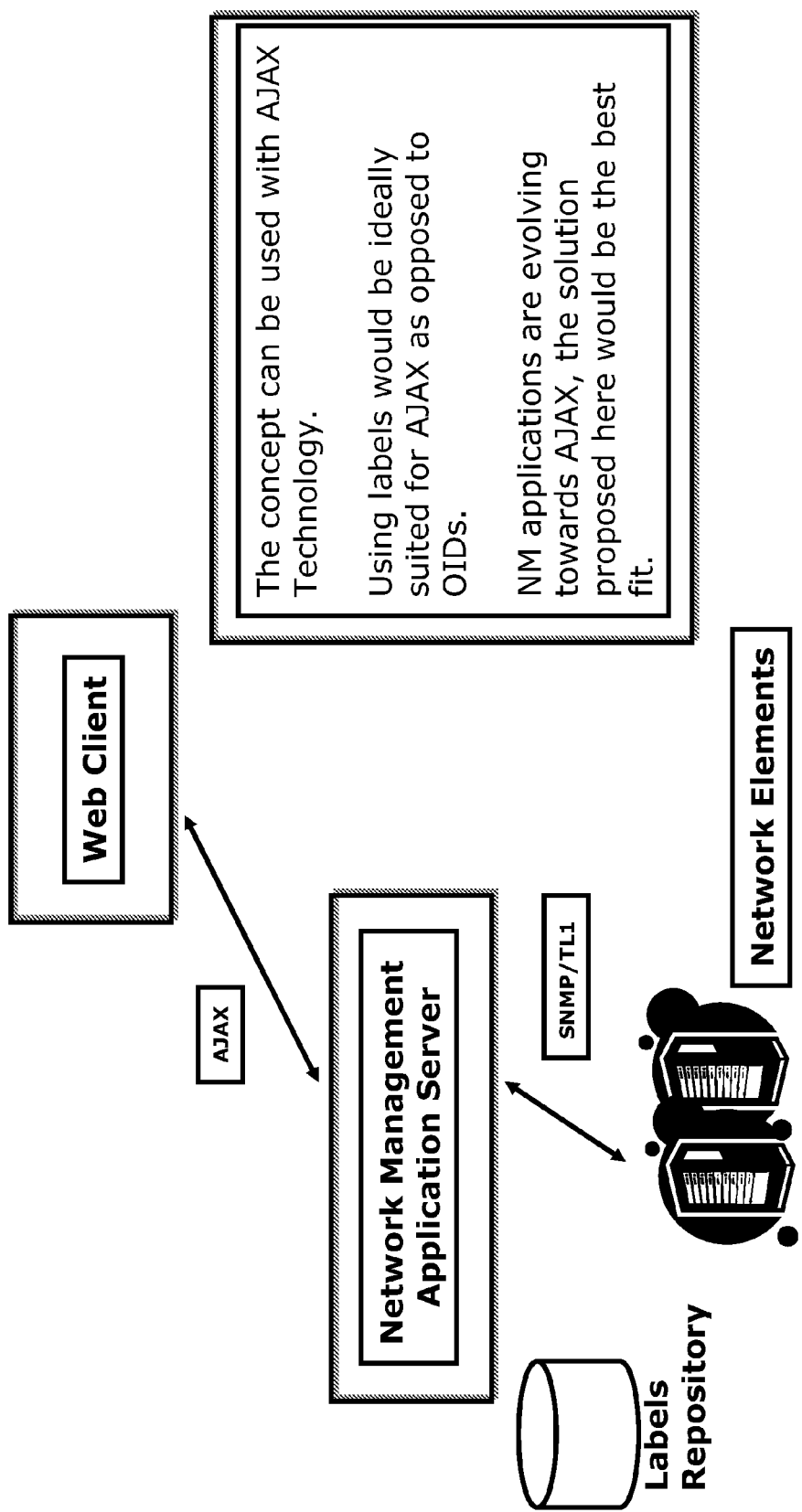
FIG. 2 illustrates the application of label based multilevel partitioning in web services applications; and, FIG. 3 illustrates the method for accessing a label based subset of subscribers using the invention.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

The use of the present invention is illustrated through exemplary scenarios. In the first scenario, there are subscribers in the network that have elected to receive GPRS service on their mobile phones, and also have opted to be connected to a 'Stock Alert' service. If the network, as the telecommunication service provider, wishes to give a promotional service to those who have subscribed to GPRS and to the 'Stock Alert' service, it will be necessary to obtain a subset of subscribers who have chosen to receive both GPRS and 'stock Alert' service. Using the prior art approach, the network operator would need to run multiple commands 1. To get the subset of such subscribers.
2. Then the operator would need to run scripts to provision the promotional service, or alternatively do them manually from the operator's graphical user interface.

In the second scenario, it is required to identify subscribers of a specific category who satisfy certain requisites, referred to for example as "Gold" subscribers. It is noted in this context that a large number of subscribers can exist for a telecom company, and these subscribers would have a certain subscriber profile configured on them. A subscriber profile typically describes the nature of service configured for the subscriber. Examples of the nature of service include: quality of service, type of service, physical and logical characteristics of the subscriber equipment, etc. In practice, one type of subscriber profile would be associated with more than one subscriber.

To perform a task such as "Upgrade the bandwidth for all 'Gold' subscribers", it would need to be done in multiple steps, if known methods of approach are followed.

The present invention expediently uses label based multi level network partitioning for visualization and operator actions. To this end, the procedure includes the following:
1. Attach labels on each network service resource on the network elements.
2. Labels can be attached to resources automatically (through programs) or manually.
3. Define a generic implementation that will build operator views based on one or more labels.

A label SNMP MIB can be written for generic implementation.

To implement the above approach,
1. Customers/subscribers are labeled as per the services subscribed (a label for each service)
2. Application generates an operator-view or listing for "Gold subscribers", based on labels "GPRS" and "Stock Alert". For this purpose, the network operator can use a label matching technique, or a label matching algorithm. Alternatively, any suitable search engine using a flat search may be used to generate a listing or subset of subscribers whereby the inefficient predominantly hierarchical approach is obviated. There can be any number of special groups of subscribers similar to the "Gold subscribers", and the label combination "GPRS" and "Stock Alert" is just an example.
3. Select the list of resources and apply the profile or perform an operator action The above approach using labels, obviates the largely hierarchical approach used in prior art with attendant disadvantages of delay and lack of efficiency.

Figure 3:
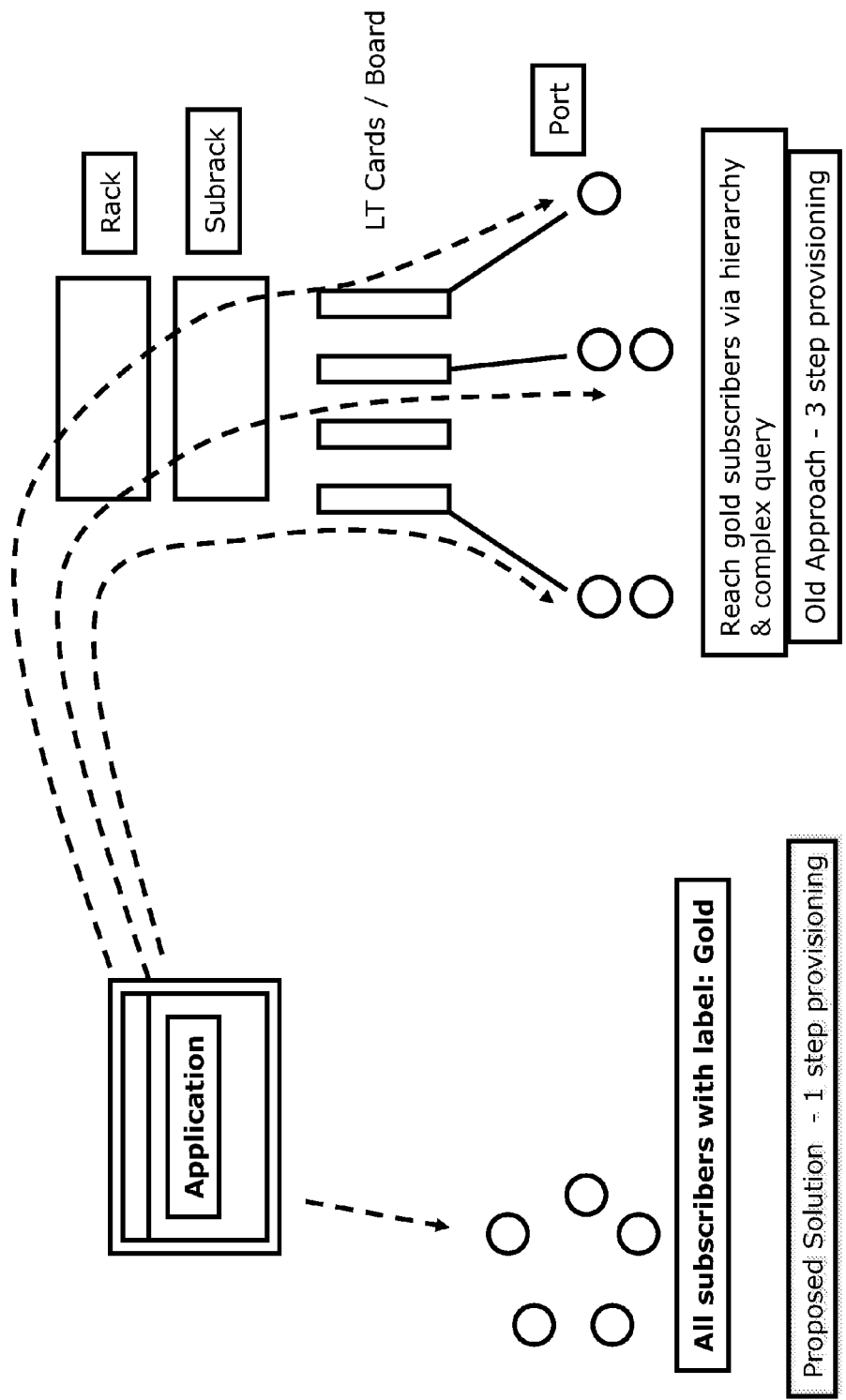

More particularly, with specific reference to FIG. 1, it is seen that based on the object which needs to be labeled, suggested label descriptions are indicated, which could be entered in the MIB. In particular, it is noted that the resource label index is a type of object identifier, and points to the MIB object that is being labeled. If however, this points a table or a group, an entire MIB tree is labeled. It is also noted that the resource label is in the form of a string which shows the value of the label. With reference to FIG. 2, an example of how the present labeling technique can be applied in web service applications is illustrated. Illustrated in FIG. 2 are network elements and a labels repository interacting with a network management server through SNMP. The label application technique taught herein is applied to AJAX (Asynchronous JAVA script XML) through which web clients or subscribers are selectively reached. It is noted that for network management applications that are evolving towards implementing the AJAX features, the label solution of the present approach would be highly suitable because of its simplicity, features and advantages. FIG. 3 shows an exemplary implementation of the present approach to the problem of having to identify certain subscribers who meet the predetermined-labels criterion, referred to hereinabove as the "Gold" subscribers. If the prior art approach is used to identify and reach the "Gold" subscribers, the process would be inefficient and need a 3-step provisioning and approach by going through the rack, sub-rack and the LT cards. Using the present approach, a flat hierarchy approach can be used in a single step search of label searching and matching to arrive at an operator's view of the "Gold" subscriber listing with attendant efficiency and advantages. Similarly, an operator's view of the groups of subscribers similar to the "Gold" subscribers may be obtained by using the labeled flat hierarchy approach of the present invention. Other examples of referring to groups of subscribers with specific label features will be known to those who are skilled in the art.

The comparison table below shows the comparison and advantages of the present label partitioning approach as opposed to the conventional largely hierarchical approach.

| Old Approach (mainly Hierarchical only) | Proposed Label Based Partitioning |
| --- | --- |
| Supports only one method of information modeling i.e., hierarchical. | Offers hierarchical AND perspective based information modeling. |
| Takes a long time for provisioning services, since every object has to be retrieved by traversing the hierarchy. | Much faster for provisioning services, since objects are organized in a flat hierarchy - i.e. Label as the key and object as the value. |
| Has to rely on OID/Containment Hierarchy tree traversal to fetch information; limited scope for optimizing traversals. | Can use modern indexing algorithms (as developed for search engines like Google ®) to reduce time of search |
| Ill-suited for web services based applications (like AJAX ®), as these rely more on strings than structured OIDs. | Best suited for web services applications as a label is nothing but a simple string (unlike an OID which can, at best be a structured string) |

The advantages provided by the present approach include the following:
1. This solution retains the concept of network hierarchy where required, and helps the operator to do away with network hierarchy completely when it is a disadvantage.
2. Modern indexing algorithms implemented herein make label searching and indexing fast.
3. SNMP MIB can facilitate a generic implementation, and, labels can be added or removed instantly and with ease.
4. Reduction in time for network management and maintenance operations is achieved.

Implementations:

The present invention can be implemented in platforms such as AJAX®, which stands for Asynchronous JavaScript® XML. It is conceivable that the present invention can be implemented in other platforms also, without limitation. It is seen that the present approach provides a simple and powerful tool for web based applications.

The present approach can be used with great benefits in NM applications such as: Web Based NMS (Network Management Systems), and Service Management applications.

Also included in the scope of the invention is a computer readable medium encoded with data/instruction which when executed by a computing platform would result in execution of a method recited in any of the paragraphs supra. Embodiments of the present subject matter may be implemented in conjunction with program modules, including functions, procedures, data structures, application programs, etc., for performing tasks, or defining abstract data types or low-level hardware contexts. Examples of said tasks in the context of this invention include attaching labels, forming an information base and label matching to obtain a subset of subscribers.

Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features may be found grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims and their equivalents. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" are used as the plain-English equivalents of the respective terms "comprising" and "wherein," respectively.

The invention claimed is:

1. A method of managing application services for subscribers comprising:
   assigning, by a network management computing device in a telecommunication network, one of a plurality of network service labels to each of one or more types of network services;
   attaching, by the network management computing device, one or more of the network service labels to a each of a plurality of subscribers that has chosen to receive one or more of the network services wherein one or more of the network service labels may be attached to more than one of the subscribers;
   creating and maintaining, by the network management computing device, a simple network management protocol (SNMP) management information base (MIB) for each of the network service labels using the computer, wherein the SNMP MIB comprises at least a resource label index pointing to at least an object, table, or group to be labeled and an entire MIB tree is labeled if the resource label index points to the table or group;
   accessing, by the network management computing device, a required category of the subscribers having a combination of predetermined attached one or more of the network service labels by using a label matching algorithm in a flat hierarchy of the SNMP MIB to generate a listing of said required category of the subscribers; and
   providing, by the network management computing device, another network service to the required category of the subscribers.

2. The method as in claim 1, wherein the network service labels comprise strings of information about a corresponding one of the network services provided by service resources or network resources.

3. The method as in claim 2, wherein the information comprises general packet radio service (GPRS) or stock-alert in one of the network resources, or a rack, subrack, line card in the subrack, or port in the line card in another of the network resources.

4. The method as in claim 1, further comprising:
   adding, by the network management computing device, one or more additional network service labels to the SNMP MIB; or
   deleting, by the network management computing device, one or more of the network service labels from the SNMP MIB.

5. The method as in claim 1, further comprising generating, by the network management computing device, an operator-view of a listing of the required category of the subscribers.

6. A non-transitory computer readable medium having stored thereon instructions for managing application services for subscribers comprising executable code which when executed by a processor, causes the processor to perform steps comprising:
   assigning one of a plurality of network service labels to each of one or more types of network services;
   attaching one or more of the network service labels to a each of a plurality of subscribers that has chosen to receive one or more of the network services, wherein one or more of the network service labels may be attached to more than one of the subscribers;

creating and maintaining a simple network management protocol (SNMP) management information base (MIB) for each of the network service labels using the computer, wherein the SNMP MIB comprises at least a resource label index pointing to at least an object, table, or group to be labeled and an entire MIB tree is labeled if the resource label index points to the table or group;

accessing a required category of the subscribers having a combination of predetermined attached one or more of the network service labels by using a label matching algorithm in a flat hierarchy of the SNMP MIB to generate a listing of said required category of the subscribers; and providing another network service to the required category of the subscribers.

7. The non-transitory computer readable medium as set forth in claim 6, wherein the network service labels comprise strings of information about a corresponding one of the network services provided by service resources or network resources.

8. The non-transitory computer readable medium as set forth in claim 7, wherein the information comprises general packet radio service (GPRS) or stock-alert in one of the network resources, or a rack, subrack, line card in the subrack, or port in the line card in another of the network resources.

9. The non-transitory computer readable medium as set forth in claim 6, further having stored thereon at least one additional instruction comprising executable code which when executed by the processor, causes the processor to perform at least one additional step comprising:

adding one or more additional network service labels to the SNMP MIB; or deleting one or more of the network service labels from the SNMP MIB.

10. The non-transitory computer readable medium as set forth in claim 6, further having stored thereon at least one additional instruction comprising executable code which when executed by the processor, causes the processor to perform at least one additional step comprising generating an operator-view of a listing of the required category of the subscribers.

11. A network management computing device, comprising a processor and a memory coupled to the processor which is configured to be capable of executing programmed instructions comprising and stored in the memory to:

assign one of a plurality of network service labels to each of one or more types of network services;

attach one or more of the network service labels to a each of a plurality of subscribers that has chosen to receive one or more of the network services, wherein one or more of the network service labels may be attached to more than one of the subscribers;

create and maintain a simple network management protocol (SNMP) management information base (MIB) for each of the network service labels using the computer, wherein the SNMP MIB comprises at least a resource label index pointing to at least an object, table, or group to be labeled and an entire MIB tree is labeled if the resource label index points to the table or group;

access a required category of the subscribers having a combination of predetermined attached one or more of the network service labels by using a label matching algorithm in a flat hierarchy of the SNMP MIB to generate a listing of said required category of the subscribers; and provide another network service to the required category of the subscribers.

12. The network management computing device as set forth in claim 11, wherein the network service labels comprise strings of information about a corresponding one of the network services provided by service resources or network resources.

13. The network management computing device as set forth in claim 12, wherein the information comprises general packet radio service (GPRS) or stock-alert in one of the network resources, or a rack, subrack, line card in the subrack, or port in the line card in another of the network resources.

14. The network management computing device as set forth in claim 11, wherein the processor is further configured to be capable of executing at least one additional programmed instruction comprising and stored in the memory to:

add one or more additional network service labels to the SNMP MIB; or delete one or more of the network service labels from the SNMP MIB.

15. The network management computing device as set forth in claim 11, wherein the processor is further configured to be capable of executing at least one additional programmed instruction comprising and stored in the memory to generate an operator-view of a listing of the required category of the subscribers.

* * * * *